US008364729B2

(12) United States Patent
Balinsky et al.

(10) Patent No.: US 8,364,729 B2

(45) Date of Patent: Jan. 29, 2013

(54) DOCUMENT MANAGEMENT SYSTEM AND METHOD

(75) Inventors: Helen Balinsky, Cardiff (GB); Liqun Chen, Bristol (GB); Steven J. Simske, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 4 days.

(21) Appl. No.: 13/050,888

(22) Filed: Mar. 17, 2011

(65) Prior Publication Data

US 2012/0239714 A1 Sep. 20, 2012

(51) Int. Cl.
*G06F 21/00* (2006.01)

(52) U.S. Cl. ......... 707/822; 707/608; 713/168; 713/178

(58) Field of Classification Search .................. 707/608, 707/822; 713/178

See application file for complete search history.

(56) References Cited

U.S. PATENT DOCUMENTS

| | | | | |
|---|---|---|---|---|
| 5,935,246 | A * | 8/1999 | Benson | 726/28 |
| 7,587,368 | B2 | 9/2009 | Felsher | |
| 7,831,827 | B2 | 11/2010 | Walmsley | |
| 7,831,829 | B2 | 11/2010 | Appenzeller et al. | |
| 2003/0014638 | A1 * | 1/2003 | Lincoln et al. | 713/178 |
| 2006/0190723 | A1 * | 8/2006 | Benson | 713/165 |
| 2011/0225417 | A1 * | 9/2011 | Maharajh et al. | 713/150 |

* cited by examiner

*Primary Examiner* — Shyue Jiunn Hwa

(57) ABSTRACT

A document management system includes a document. One or more of a plurality of map-files of the document correspond(s) with a step of a multi-step workflow associated with the document. A random nonce is generated for each of the steps of the multi-step workflow except for an initial step of the multi-step workflow. Each of the random nonces i) is incorporated as a map-file entry into a respective one of the plurality of map-files corresponding with a step of the multi-step workflow that directly precedes the step of the multi-step workflow for which the random nonce is generated and ii) is used to perform a nonce-based initiating operation a respective one of the plurality of map-files corresponding with the step of the multi-step workflow for which the random nonce is generated.

18 Claims, 3 Drawing Sheets

DOCUMENT MANAGEMENT SYSTEM AND METHOD

BACKGROUND

The present disclosure relates generally to a document management system and method.

Many documents have become a mixture, or a composite, of differentially formatted parts. Composite documents may be presented to a user by specialized software as one editable, browsable, approvable, playable document. Different parts are combined together through various serialization mechanisms, e.g., java jar-archive, HP dlf, etc. One example of a composite document is a document-based proposal, including product jpeg-images, a marketing way-clip, a ppt-presentation and an xsl-spreadsheet with financial details.

In many instances, multiple workflow participants contribute to different parts of composite documents with different access levels. It may also be desirable or necessary, in some instances, to export a composite document outside of a secured environment or between differently-secured environments, and then, after the document is updated over a set/sequence of workflow steps, re-import the document back into the secured environment or the differently-secured environment. When publicly-posted composite documents are distributed over non-secure channels, documents may inadvertently become lost (i.e., never delivered to the intended recipient) or be delivered in non-authentic form.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
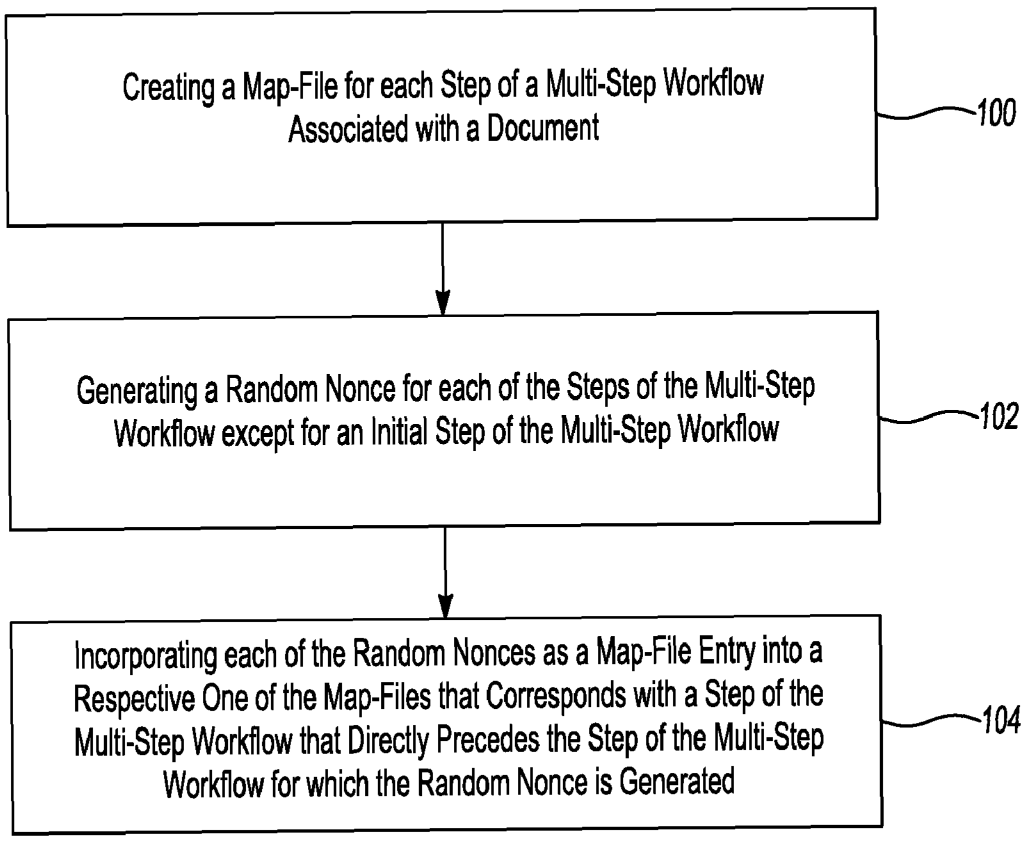
FIG. 1 is a flow diagram depicting an example of a document management method according to the present disclosure.

Examples of the document management system and method disclosed herein are used to ensure that every participant at a particular stage in a workflow accesses and/or contributes before the composite document is propagated along the workflow. This prevents the composite document from being accessible by the next participant(s) too early, and thus also prevents accidental diversion of the composite document in the workflow. If the composite document is inadvertently sent to some subsequent participant too early (i.e., prior to his/her turn in the workflow), the examples disclosed herein ensure that the participant is unable to recover his/her map-files and thus is unable to access the document content.

As used herein, the term “workflow” refers to a defined set of stages, usually with task(s) at each stage, which a document or composite document must pass through during its lifecycle. A document includes a single item, while a composite document includes several items (e.g., PDFs, PPTs, DOCs, etc.). In one example, the workflow is an automated process during which documents, information, and/or tasks are passed from one participant to another for action or informative purposes, according to a set of procedural rules. Workflows include imaging workflows (e.g., quality assurance, authentication, forensics, etc.), supply chain workflows (e.g., track and trace, inspection, shipping/receiving, recall, etc.), environmental or sensor data monitoring workflows, or other suitable workflows (e.g., statistics (such as inventory and the like), compliance, auditing, etc.). In other words, a workflow is any defined set of tasks to complete associated with a document or composite document. When one of the specific terms, i.e., document or composite document, is used herein, it is to be understood that the description may also be applicable to the non-recited term, i.e., composite document or document. For example, if an example described herein involves a composite document, the description of the example may also be applicable to a document.

A workflow may involve numerous participants, many or all of whom do not or may not know the other participants. The composite document that is the subject of the workflow may be transferred between workflow participants by any available channel, including, for example, electronic mail (e-mail), any publicly shared memory device (e.g., a compact disc (CD), a digital video disk (DVD), a universal serial bus (USB) key, etc.), public posting systems (e.g., cloud computing systems where documents may be uploaded and downloaded, file sharing systems (e.g., Sharepoint, etc.)), or the like.

Each workflow participant is provided with the entire composite document, although one or more parts of the composite document may be accessible for reading only, accessible for reading and writing, or not accessible for reading or writing. It is desirable to provide the entire composite document because later participant(s) in the workflow may require access to parts that an earlier workflow participant cannot access.

In the examples disclosed herein, the composite document includes i) individual content items or parts, each of which consists of multiple individual files and fragments, ii) one or more map-files for each participant in the workflow, each map-file providing differential access for the respective participants, and, in some instances, iii) an entry table, which is a fast filtration mechanism to identify a participant’s map-file without exposing the participant’s identity. A “map-file” is a subset of access keys to document parts corresponding to the access granted to a particular participant at a particular workflow step. Each map-file (except for the last map-file in a workflow) stores therein a nonce that, upon being released as a result of the then-current workflow step being complete, enables the next workflow participant to recover his/her map-file and ultimately access the composite document. When multiple map-files are used throughout the workflow, each one is named in the document using random identifiers. Using the entry table and a participant’s private decryption key, the user can readily determine which map-file is his/hers.

In the examples disclosed herein, the workflow is an ordered workflow, where one participant is associated with each step of the workflow. As such, in an ordered workflow, one participant is allowed access at each step, and the access is provided by the corresponding map-file.

In order to provide controlled differential access to a composite document content item/part, the item/part is encrypted by its own specially-generated and assigned encryption key $E_{i/p}$. An extra pair of keys for each part is provided, namely a signature key $S_{i/p}$ and a signature verification key $V_{i/p}$. The access control for a composite document part is thus enabled by 4 keys: $\{\{E_{i/p}, D_{i/p}\}, \{S_{i/p}, V_{i/p}\}\}$, where $D_{i/p}$ is the decryption key. Read-only access is controlled by having or not having decryption key $D_{i/p}$. Read and write access requires three keys $E_{i/p}$, $D_{i/p}$, $S_{i/p}$. An item will be decrypted using $D_{i/p}$, modified as needed, encrypted using $E_{i/p}$ and then signed using $S_{i/p}$. A workflow participant without any granted access to a content part is given a signature verification key $V_{i/p}$ that will allow the user to validate item authenticity (i.e., the user has validate access).

As such, every item/part of a composite document is signed by its own signature key $S_{i/p}$, and every workflow participant is securely given the corresponding signature verification key $V_{i/p}$ for each item/part, irrespective of the type of granted access. Upon reception, it is mandatory that every workflow participant verifies the signature of every item/part using the corresponding signature verification key $V_{i/p}$. Participants can access for reading only those parts for which he/she is given the corresponding decryption key $D_{i/p}$, and can modify only those parts for which he/she is given $E_{i/p}$, $D_{i/p}$, $S_{i/p}$. The user uses $E_{i/p}$ to encrypt modified contents and generate a new signature using $S_{i/p}$, which is validated by the subsequent workflow participant.

In the examples disclosed herein, random nonce(s) is/are also included (in addition to the previously mentioned keys) that aims to enforce workflow order. FIG. 1 illustrates an example of the document management method utilizing the random nonce(s). As shown at reference numerals 100 through 104, a map-file is/are generated for each step of a multi-step workflow, a random nonce is generated for each of the workflow steps except the initial workflow step, and one of the random nonces is incorporated as a map-file entry into a respective one of the map-files that corresponds with a step of the workflow that directly precedes the step of the workflow for which the random nonce is generated. An example of the method shown in FIG. 1 utilizing the random nonces is described further hereinbelow in reference to FIG. 2A, which illustrates workflow creation and FIG. 2B, which illustrates workflow propagation. In the examples of the method disclosed herein, there is one map-file generated for each step of the workflow, and there is one nonce generated for each step of the workflow except for the first step of the workflow (see, e.g., FIG. 2A).

It is to be understood that any random nonce may be utilized. The random nonce(s) may be generated via a variety of techniques, including any technique that generates a random number or sequence. Random numbers or sequences may be generated, for example, by linear feedback shift registers, chained XOR'ing of semi-(pseudo-)random strings, or the like. In one example, a cryptographically secure random number generator of a document management system generates one or more random binary strings, each of which is a random nonce. A random number generator is a computational device designed to generate a sequence of numbers or symbols that lack any pattern. In another example, a pseudo-random number generator (PRNG), also known as a deterministic random bit generator (DRBG), of the document management system may be used to generate the random nonce(s). The PRGN utilizes an algorithm (e.g., linear congruential generators, Lagged Fibonacci generators, linear feedback shift registers, feedback with carry shift registers, generalized feedback shift registers, etc.) for generating a sequence of numbers that approximates the properties of random numbers. In still another example, an operation is applied to a map-file to remove a certain number of bytes therefrom. Any operation may be deployed to remove the bytes, as long as the map-file cannot be restored/retrieved without the missing bytes. These missing bytes should not be predictable, and can effectively be used as the random nonce.

It is to be understood that the randomly generated nonces are used once, and are not repeated between various workflow steps and/or documents.

The random nonce is utilized by neighboring participants in the workflow. "Neighboring participants" are workflow participants who work on or access the document or composite document in a sequential manner. For example, participant i may work on the composite document and release the random nonce from his/her map-file, and then participant i+1 may subsequently access the random nonce, restore his/her map-file using the random nonce, gain access to the composite document using his/her private description key, and then work on the composite document. Participant i could e-mail, post on CD/DVD, etc. the document or composite document and released random nonce to participant i+1. Participants i and i+1 are neighboring participants in the workflow, where one participant is the sender of the document and another participant is the receiver of the document.

Figure 2A:
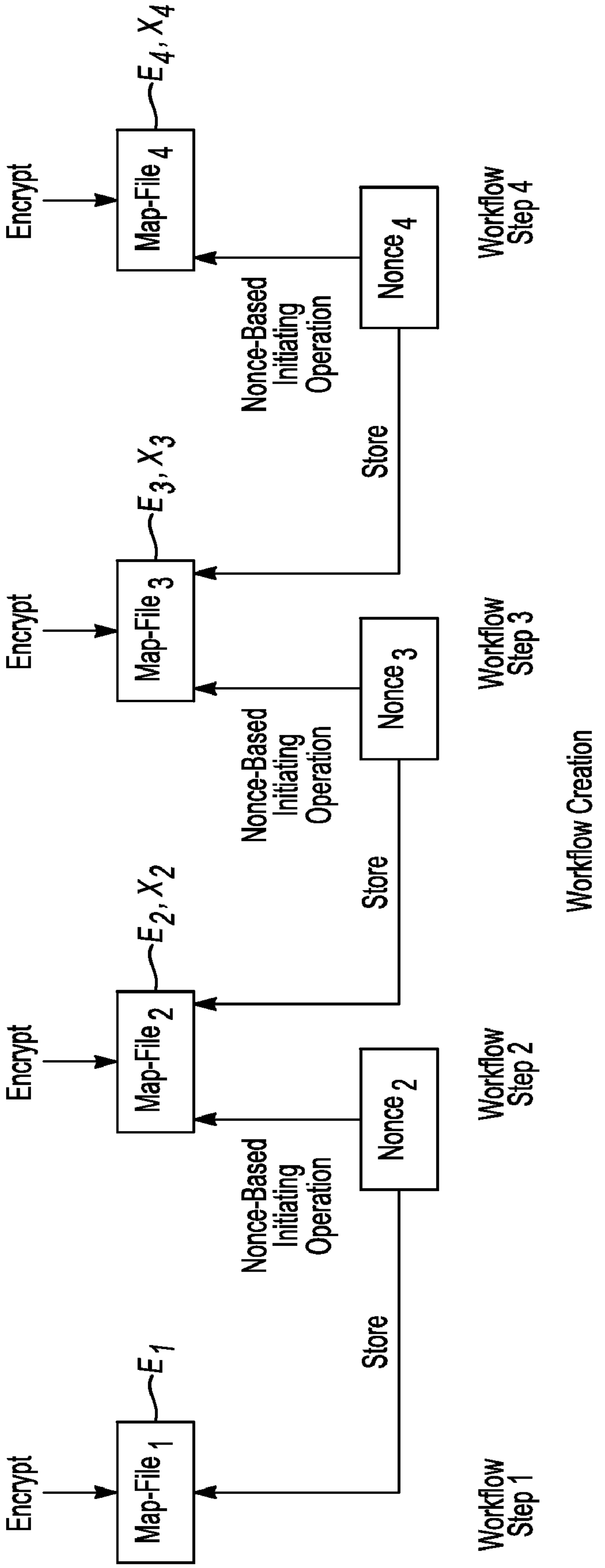
FIG. 2A is a schematic diagram illustrating an example of the creation of a workflow.

The random nonces are, in effect, one-time pads that ensure workflow order. In one example, each of the respective random nonces is used to encrypt its corresponding map-file, but is stored in another map-file, namely one that corresponds with a preceding workflow step (see FIG. 2A). For example, if the nonce is generated for workflow step N, the nonce can be used to encrypt the map-file corresponding with workflow step N and is stored in the map-file corresponding with the workflow step N−1. During workflow progression, when the preceding workflow step (e.g., N−1) is complete, the random nonce is released and can be used to restore the map-file associated with the next step (e.g., N) of the workflow (see FIG. 2B). The examples shown in FIGS. 2A and 2B include four workflow steps and four workflow participants. As shown in FIG. 2A, during workflow creation, a map-file (e.g., map-file$_1$, map-file$_2$, map-file$_3$, map-file$_4$) is generated for each participant at each workflow step. In the examples disclosed herein, the number of map-files is equivalent to the number of workflow steps.

During document and workflow creation, random nonces (e.g., nonce$_2$, nonce$_3$, nonce$_4$) are then generated for each of the map-files, except the map-file corresponding with the initial or first workflow step. In the example shown in FIG. 2A, random nonces nonce$_2$, nonce$_3$, nonce$_4$ are generated for all workflow steps that follow workflow step 1. The random nonces nonce$_2$, nonce$_3$, nonce$_4$ may be generated as previously described.

The random nonces nonce$_2$, nonce$_3$, nonce$_4$ are then added to (incorporated into, stored in) the map-files map-file$_1$, map-file$_2$, map-file$_3$ that are associated with the preceding workflow step. In general and not shown in FIG. 2A, an additional key is added to the map-file $M_i$ when the nonce $R_{i+1}$ from the subsequent work step (i+1) is added to the map-file $M_i$ (where $i=1, \ldots, N-1$ and N=the total number of workflow steps). The nonce value is added into the map-file as a map-file entry. Referring specifically to the example shown in FIG. 2A and starting with the first workflow step (i.e., the initial step), the nonce value (e.g., nonce$_2$) generated for the immediately subsequent workflow step (i.e., the second workflow step) is incorporated into the map-file (e.g., map-file$_1$) associated with the first workflow step. Moving on to the second workflow step, the nonce value (e.g., nonce$_3$) generated for the immediately subsequent workflow step (i.e., the third workflow step) is incorporated into the map-file (e.g., map-file$_2$) associated with the second workflow step. With regard to the third workflow step, the nonce value (e.g., nonce$_4$) generated for the immediately subsequent workflow step (i.e., the fourth workflow step) is incorporated into the map-file (e.g., map-file$_3$) associated with the third workflow step. In this example, since the fourth workflow step is the end of the workflow (i.e., there are no additional subsequent steps), there is no nonce incorporated therein. In any example, it is to be understood that the final workflow step does not have a nonce incorporated therein.

Once the nonces $nonce_2$, $nonce_3$, $nonce_4$ are added to/stored in the appropriate map-files map-$file_1$, map-$file_2$, map-$file_3$, each map-file map-$file_1$, map-$file_2$, map-$file_3$, map-$file_4$ is encrypted using a suitable encryption technique (e.g., using a public encryption key, using hybrid encryption (i.e., data is encrypted by a specially generated symmetric encryption key, which is then encrypted using the participant's public encryption key), etc.). In one example, each of the map-files map-$file_1$, map-$file_2$, map-$file_3$, map-$file_4$ is encrypted using any cryptography that can be decrypted by the intended workflow participant alone. For example, the first map-file map-$file_1$ may be encrypted using hybrid encryption. The subsequent map-files map-$file_2$, map-$file_3$, map-$file_4$ may be encrypted in a similar manner using hybrid encryption. Encryption may be accomplished via an encryption module, which includes software modules, hardware modules, or a combination of software and hardware modules. The encrypted map-files are shown as $E_1$, $E_2$, $E_3$, $E_4$ in FIGS. 2A and 2B.

An additional operation is then applied to each of the encrypted map-files $E_2$, $E_3$, $E_4$, excluding the encrypted map-file $E_1$ associated with the first workflow step. As such, in the example shown in FIG. 2A, the additional operation is applied to encrypted map-files $E_2$, $E_3$, $E_4$. The additional operation is also referred to herein as a nonce-based initiating operation. In the example shown in FIG. 2A, the subsequent map-files map-$file_2$, map-$file_3$ map-$file_4$ are operated on using the nonce $nonce_2$, $nonce_3$, $nonce_4$ associated with the respective map-file map-$file_2$, map-$file_3$ map-$file_4$ and/or the respective workflow step 2, 3, 4. In one example, each nonce $nonce_2$, $nonce_3$, $nonce_4$ is used to perform the nonce-based initiating operation on the corresponding map-file map-$file_2$, map-$file_3$ map-$file_4$. As such, in the example shown in FIG. 2A, map-$file_2$ undergoes the nonce-based initiating operation using $nonce_2$, map-$file_3$ undergoes the nonce-based initiating operation using $nonce_3$, and map-$file_4$ undergoes the nonce-based initiating operation using $nonce_4$. In one example, the nonce-based initiating operation is an XOR operation. It is to be understood, however, that any other nonce-based initiating operation can be used. For example, if an encryption algorithm makes use of an arbitrary starting value, such as the one in a Counter (CTR) mode, specified in ISO/IEC 10116, the nonce can be used as such a starting value. Without knowing the starting value, the decryption operation cannot be performed, even with the correct decryption key. In an example using an XOR operation, the encrypted map-files $E_2$, $E_3$, $E_4$ are XOR'd with their assigned nonces $nonce_2$, $nonce_3$, $nonce_4$. Generally, the map-file that has been operated on is represented as $X_i$, where $X_i = E_i$ XOR $R_i$ (where R is the nonce, $i=2, \ldots, N$, and N equals the number of workflow steps). The nonce-based initiating operation is used to ensure that the rightful workflow participant can access the document when it is his/her turn, and not before or after.

The encrypted map-file $E_1$ and the encrypted and operated on map-files $X_2$, $X_3$, $X_4$ are then placed into the top or first level of the document/composite document serialization. This placement may be accomplished via any suitable technique.

Figure 2B:
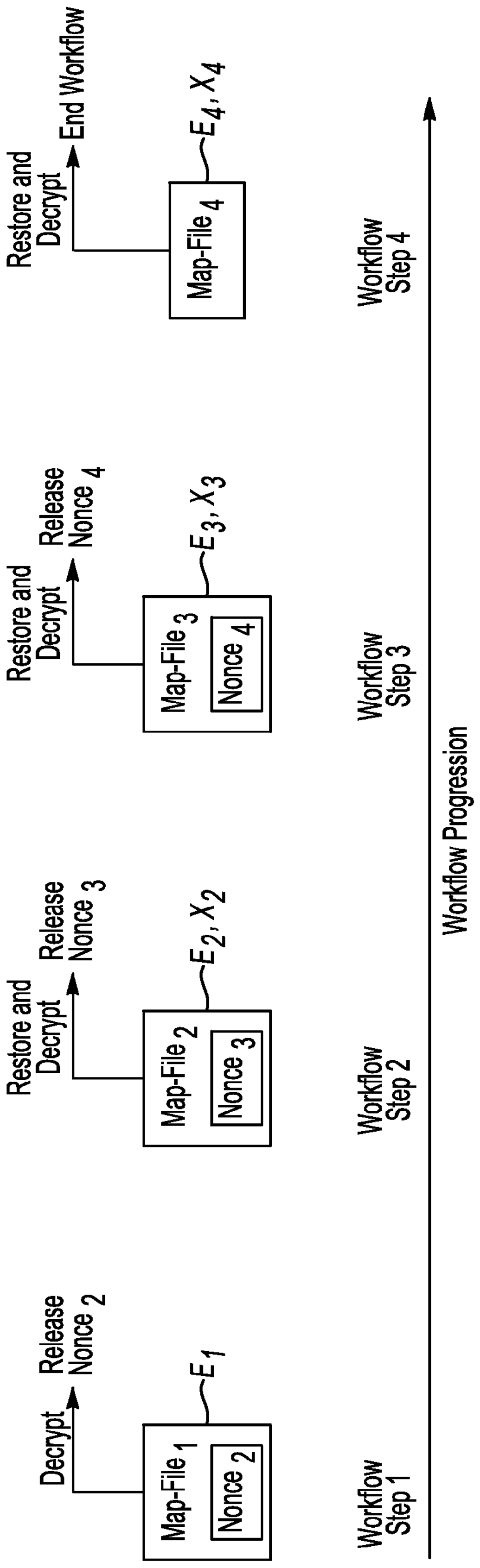
FIG. 2B is a schematic diagram illustrating an example of the progression of the workflow in FIG. 2A.

Once the document/composite document is generated and includes the desired map-files $E_1$, $X_2$, $X_3$, $X_4$, the workflow may be commenced. The propagation of the document/composite document through the workflow is shown in FIG. 2B.

Since the first workflow participant's map file is encrypted, he/she can decrypt the map-file $E_1$ with his/her key(s) (e.g., specially generated, private, etc.), access the items/parts he/she is allowed to access (based on the item/part keys described above), and release the nonce $nonce_2$ for the next participant. The nonce can be released when the participant gains access to the composite document or after the participant performs his/her workflow tasks and explicitly selects to release the nonce.

The released nonce(s) appear(s) in clear text within the document or become(s) available in a cloud. In either instance, the next workflow participant is able to access the released nonce. It is to be understood that the map-file of the next participant is incomplete, and thus cannot be decrypted, unless the nonce stored in the previous map-file is released. Once the nonce is released, the next participant is able to restore his/her map-file using this nonce. In one example, this map-file is further encrypted using some hybrid encryption, as previously described. As such, the next workflow participant (who has a valid entry in the map-file) is able to decrypt the restored map-file because he/she has the corresponding key. An attacker, on the other hand, cannot perform this decryption as he/she does not have the corresponding key.

When the workflow participant accesses the released nonce, he/she can then restore the map-file and use one or more decryption keys (depending upon the encryption technique used) to access his/her map-file. Unlike the first workflow participant, any subsequent workflow participants (i.e., those workflow participants gaining access to the composite document at any of the steps following the initial workflow step) initiate multiple tasks in order to restore, and decrypt his/her map-file. In one example, the participant instructs the system to apply the nonce-based initiating operation (using the released nonce and the map-file) in order to restore the encrypted map-file, and then to decrypt the restored encrypted map-file using the appropriate key(s). It is to be understood that applying the same nonce-based initiating operation twice to the same object restores the original object (e.g., q XOR pXOR q=p, and thus XORing twice with the same q restores p).

When or after the workflow participant restores and decrypts his/her map-file, he/she also releases the nonce that was stored in his/her map-file. This nonce can then be used by the next workflow participant. As such, when or after the second workflow participant in FIG. 2B restores his/her map-file (from $X_2$ to $E_2$) and decrypts his/her map-file $E_2$, he/she also releases the nonce stored therein (e.g., $nonce_3$), which is used by the third workflow participant to restore his/her map-file. The process of accessing the nonce, restoring the map-file, gaining access to the document (via decryption), and releasing a stored nonce is repeated until the last workflow participant access the document. Since the final workflow participant does not have a nonce in his/her map-file, after he/she completes his/her workflow tasks, the workflow is terminated.

It is to be understood that when a nonce is contained in a map-file, the release of the nonce may be automatic or following user command. This means that once a participant has accessed the composite document, the nonce for the next participant is/are automatically released or in response to a user command (through a graphical user interface, "gui"). In some instances, it may be desirable to afford a single participant or one or more of the participants the opportunity for multiple consequent sessions within the composite document. In these instances, the participant accesses his map-file, performs some functionality, and then two scenarios may occur. In one example, after the participant initially accesses the document, the original map-file remains in place unchanged, despite the fact that it was read to the memory and decrypted. As a result, the workflow step does not advance. Rather, in this example, the same participant needs to access the document again to release the nonce. It is noted that, in some instances, the original map-file may always remain in place unchanged. In another example, after the participant initially accesses the document, the nonce is released and placed into the document serialization so that the next participant can access the nonce and recover his/her map-file. In this example, the application can be programmed to release document control and the nonce by default on the first access or in response to a user command. When document control release is set up in response to a user command, it may be desirable to provide the user the option of releasing the document and nonce at that point, or to save the document in its then-current state for later access. This level of control can be achieved by application control. For example, when a workflow participant saves his/her current work, the application can provide a pop-up window or a "release" button for the participant to release the composite document and nonce for the next participant. When the participant saves the composite document and does not release the document and the nonce, the original participant's map-file and the nonce are retained in place at least until the next iteration and when he/she releases the document and the nonce.

Referring back to FIG. 2A, the system distributes all of the nonces within the encrypted map-files at the outset of the workflow. For example, when the number of workflow participants is known, the number generator can assign random nonces to each of the known map-files prior to the initiation of the workflow (i.e., during workflow creation).

The composite document system (which may be a publicly posted system) disclosed herein includes a secure authoring tool and one or more individual computing systems or modules that perform one or more steps of the method disclosed herein.

The secure authoring tool enables the document master to generate the composite document, the workflow, and the nonces that guarantee workflow propagation. The secure authoring tool includes or is in communication with other modules (e.g., encryption module) in order to accomplish these tasks. The document distribution version is exported by the secure authoring tool out of the master version of the document. The master version is retained in the secure location, while the secure distribution version is shipped among workflow participants by any available channel.

The individual computing systems may be stationary (e.g., desktop computers) or mobile (e.g., laptop computers, netbooks, cellular phones, personal digital assistants (PDAs), etc.)). The individual computing systems run one or more applications that enable the participants to obtain access to item(s) of the composite document according to preset (granted) access rights, and that perform decryption, encryption, signature verification, and/or signing.

In one example, the secure authoring tool is part of a larger system that enables the creation of documents/composite documents and workflows. This larger system also includes modules and/or sub-systems that enable the documents/composite documents to be uploaded and downloaded, or to be shared via a shared drive or a cloud computing network. In this example, a variety of workflow participants can access the documents/composite documents from individual computers by accessing the shared drive or cloud computing network (which does not involve using the secure authoring tool).

In another example, the secure authoring tool may also be accessible via the Internet and unassociated with any particular shared drive or cloud computing network. In these instances, document(s) are transmitted via publicly shared memory devices, such as CDs, DVDs, USBs, etc. or any other suitable channel.

When part of the system, the shared drive or cloud computing network may be associated with a network of interconnected computers and/or other electronic devices (e.g., scanners, printers, etc.), including virtualized and/or redundant processors, banks of processors and/or servers, etc. It is to be understood that the components of the shared drive or cloud computing network may be implemented in a consolidated location, or portion(s) of the shared drive or cloud computing network may be implemented at different locations. In one example, the shared drive or cloud computing network is a virtualized bank of computers (e.g., processors and/or servers) that enables Internet-based computing (through which the secure authoring tool can be accessed). Software and data associated with the shared drive or cloud computing network are stored on servers and their associated memory.

The hardware of the shared drive or cloud computing network or individual computing systems includes an electronic processing device, such as, for example, a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor. Computer program(s) and/or software (e.g., computer readable code) may be loaded onto one or more of the sub-systems, and stored in a memory thereof. Such programs and/or software are executable via a processing device.

While several examples have been described in detail, it will be apparent to those skilled in the art that the disclosed examples may be modified. Therefore, the foregoing description is to be considered non-limiting.

What is claimed is:

1. A document management system, comprising:

a processing device;

a secure authoring tool including software modules, embodied on a tangible, non-transitory, computer readable medium, executable by the processing device, the secure authoring tool generating:

a document;

a plurality of map-files of the document, each of the plurality of map-files corresponding with a step of a multi-step workflow associated with the document; and a random nonce for each of the steps of the multi-step workflow except for an initial step of the multi-step workflow, wherein each of the random nonces i) is incorporated as a map-file entry into a respective one of the plurality of map-files corresponding with a respective one of the steps of the multi-step workflow that directly precedes the step of the multi-step workflow for which the random nonce is generated and ii) is used to perform a nonce-based initiating operation on a respective one of the plurality of map-files corresponding with the step of the multi-step workflow for which the random nonce is generated;

wherein:

each of the plurality of map-files is encrypted; and each of the plurality of map-files, except for one of the plurality of map-files corresponding with the initial step of the multi-step workflow, has the nonce-based initiating operation applied thereto.

2. The document management system as defined in claim 1 wherein each of the random nonces is releasable from its respective one of the plurality of map-files when or after the respective one of the plurality of map-files is decrypted.

3. The document management system as defined in claim 2, further comprising a public-posting system that makes available each of the random nonces after the random nonce is released from its respective one of the plurality of map-files.

4. The document management system as defined in claim 1 wherein one of the plurality of map-files that corresponds with the initial step of the multi-step workflow is encrypted with a cryptographic method using a participant's key.

5. The document management system as defined in claim 1 wherein each of the random nonces is a number of bytes from the map-file that corresponds with the step of the multi-step workflow for which the random nonce is generated.

6. The document management system as defined in claim 1 wherein the plurality of map-files is placed into a first level of a serialization of the document.

7. The document management system as defined in claim 1 wherein one of the plurality of map-files corresponding with a last step of the multi-step workflow does not include any of the random nonces incorporated therein.

8. The document management method as defined in claim 1 wherein the document is a composite document.

9. The document management system as defined in claim 1 wherein each of the plurality of map-files is encrypted using public key encryption, symmetric key encryption, or hybrid encryption.

10. A document management method, comprising:

creating a map-file for each step of a multi-step workflow associated with a document;

generating a random nonce for each of the steps of the multi-step workflow except for an initial step of the multi-step workflow;

incorporating each of the random nonces as a map-file entry into a respective one of the map-files that corresponds with a step of the multi-step workflow that directly precedes the step of the multi-step workflow for which the random nonce is generated, each of the creating, the generating, and the incorporating being accomplished by a processing device executing software modules, embodied on a tangible, non-transitory, computer readable medium, of a secure authoring tool;

encrypting each of the map-files, the encrypting being accomplished by the processing device executing an encryption module embodied on a tangible, non-transitory, computer readable medium; and applying a nonce-based initiating operation to each of the map-files, except for the map-file that corresponds with the initial step of the multi-step workflow, using the random nonce that is generated for the step of the multi-step workflow corresponding with the respective map-file, the applying being accomplished by the processing device executing the software modules of the secure authoring tool.

11. The document management method as defined in claim 10, further comprising placing all of the map-files into a first level of a serialization of the document, the placing being accomplished by the processing device executing the software modules of the secure authoring tool.

12. The document management method as defined in claim 11, further comprising:

initiating the multi-step workflow;

decrypting the map-file that corresponds with the initial step of the multi-step workflow, thereby releasing the random nonce generated for a second step of the multi-step workflow, the decrypting being accomplished by a processing device of an individual computing system associated with the initial step of the multi-step workflow;

accessing the random nonce generated for the second step of the multi-step workflow; and applying a nonce-based initiating operation using the random nonce generated for the second step of the multi-step workflow to restore the map-file that corresponds with the second step of the multi-step workflow;

each of the accessing and the applying being accomplished by a processing device of an individual computing system associated with the second step of the multi-step workflow.

13. The document management method as defined in claim 12, further comprising decrypting the map-file that corresponds with the second step of the multi-step workflow, the decrypting being accomplished by the processing device of the individual computing system associated with the second step of the multi-step workflow.

14. The document management method as defined in claim 10 wherein generating the random nonce includes applying an operation that removes a number of bytes from the map-file that corresponds with the step of the multi-step workflow for which the random nonce is generated.

15. The document management method as defined in claim 10 wherein generating the random nonce is accomplished via generating a random string.

16. The document management method as defined in claim 10 wherein generating the random nonce is accomplished by applying a chained XOR operation.

17. The document management method as defined in claim 10 wherein the document is a composite document.

18. The document management method as defined in claim 10 wherein each of the map-files is encrypted using public key encryption, symmetric key encryption, or hybrid encryption.

* * * * *